J. R. Whittemore.
Harvester Rake.

No. 35343

Patented May 20 1862

Inventor
Jonathan R Whittemore

Witnesses
John R Whittemore
Milton Bradley

UNITED STATES PATENT OFFICE.

JONATHAN R. WHITTEMORE, OF CHICOPEE FALLS, MASSACHUSETTS.

IMPROVEMENT IN RAKES FOR HARVESTERS.

Specification forming part of Letters Patent No. 35,343, dated May 20, 1862.

*To all whom it may concern:*

Be it known that I, JONATHAN R. WHITTEMORE, of Chicopee Falls, in the county of Hampden and Commonwealth of Massachusetts, have invented a new and useful Rake for Harvesters; and I do hereby declare that the following is a full, clear, and exact description of the construction and operation of the same, reference being had to the accompanying drawings, making a part of this specification.

This invention is applicable to reapers or harvesters in which the grain is made to fall on a table or platform on the machine after being cut, and from which table it is to be raked as soon as a sufficient quantity is cut to form a bunch of suitable size.

Figure 3:
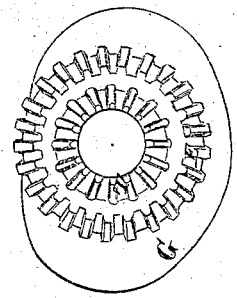
Figure 1:
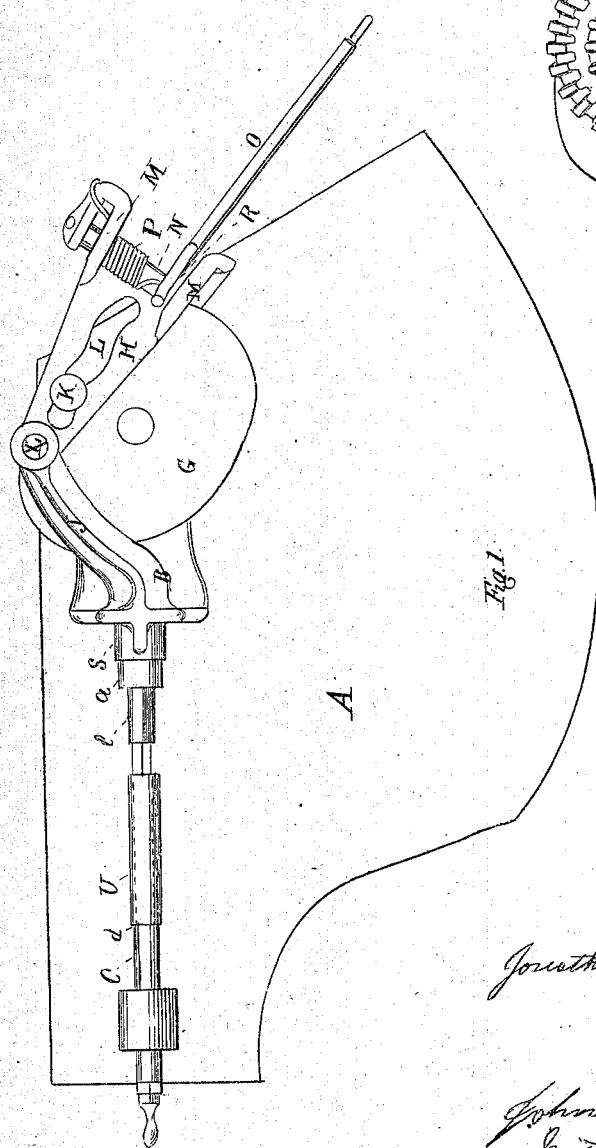
Figure 2:
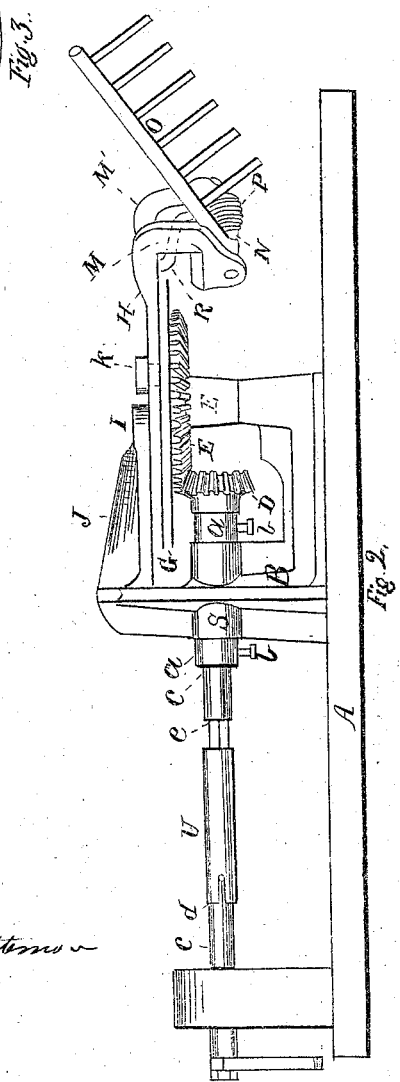

In the drawings making a part of this specification, Figure 1 is a plan or top view of the machine; Fig. 2, a side elevation, and Fig. 3 a bottom view of the cam-plate and bevel-gears combined.

Like letters of reference indicate corresponding parts in each of the figures.

A is the platform of the harvester, for receiving the cut grain.

B is a frame of cast-iron, attached to the platform A and supporting the other parts of the machine.

C is a horizontal shaft, driven by belt, gears, or other connection from the driving-shaft of the harvester.

On the shaft C is a pinion, D, working into a gear, E, on the upright shaft F.

G is a plate-cam forming, as here shown, the back of the gear E, and might be so constructed to save weight and expense; but this particular combination of the gear and cam is not necessary to the working of the machine, as they could as well be made separate and attached to the same shaft or bolted together.

H is a cam-lever, having a permanent fulcrum at I on an arm, J, of the frame B.

K is a stud or pin in the plate-cam G, and working in a cam-slot, L, in the lever H. This lever is provided with two arms, M M', which form bearings to support the short shaft N, to which is attached the rake O.

P is a coiled spring on the shaft N, which spring tends to throw the rake up and keep the arm R in contact with the plate-cam G. The arm R, and also the pin K, might be provided with friction-rolls to bear on the cams.

The operation is as follows: Motion being given to the shaft C, it is communicated through the bevel-gears to the vertical shaft F. Now, as the bevel-gear E and plate-cam G rotate, the stud K operates in the cam-slot L to give the cam-lever H, and consequently the rake, a reciprocating swinging motion. Now, the cam-plate G is of such a form as to bear against the arm R and throw the rake down just when it commences to move in the direction in which the grain is to be moved, and also to hold it down until it shall have swept the grain off from the platform. Then as the rake is about to move back, it allows it to be thrown up, by means of the spring P, out of the way of the grain. Now, when the grain is very heavy it is necessary to have it removed from the platform more often than when it is lighter; therefore I form on the under side of the plate-cam a series of two or more gears concentric with each other. The pinion-shaft C is constructed so as to slide in its bearing at S, being held in place by the collars $a$ $a'$, which are attached to the shaft by the set-screws $b$ $b'$. Now, if the grain is heavy, and therefore requires to be raked off frequently, I loosen the collars $a$ $a'$ and slide the pinion into gear with the inner gear, T, (seen in Fig. 3,) thus rotating the vertical shaft faster, and therefore accomplishing the desired result.

To facilitate the moving of the pinion from one gear to another, the bearing of the shaft at 3 may be made movable vertically, so that the pinion can be dropped down clear of the gear, and then be brought up to place again in connection with another gear and confined there; but this last arrangement is merely a matter of convenience and probably not necessary. Thus the movement of the rake relative to the motion of the machine over the ground can be varied at pleasure to suit the circumstances of the case.

U is a sleeve connecting two parts of the shaft C. The hole in the sleeve at $d$ is round and fits the end of the shaft sufficiently to give it a bearing. The hole throughout the remainder of the sleeve is square, and fits onto a square shank on the part $e$ of the shaft, to which the pinion is attached. This square shank is long enough to allow the pinion to be changed from the outer to the inner gear without drawing the shank out of the sleeve. In the end of the sleeve at $d$, I form notches and corresponding projections on the shaft, so that when the sleeve is forced back onto the shaft the projections enter the notches, and thus form a clutch, connecting the two parts of the shaft. When the sleeve is moved toward the pinion so as to remove the projections on the shaft from the notches in the sleeve, then the part *d* of the shaft is free to revolve without imparting motion to the rake. Thus, when the machine comes to a thin place in the grain, so that the bunches of grain would not be large enough, the driver can disconnect the rake and keep it so until enough grain has accumulated, and thus graduate the motion of the rake to suit all circumstances. Now, the cam-slot L can be so formed as to give any desirable variation in the speed of the rake throughout the different portions of its horizontal motion—as, for instance, at the first end of the sweep—the rake has not so much load, and therefore can move faster, and as the grain accumulates before it the speed may be reduced, so as to keep the power required to move it nearly constant. Also, the rake requires a comparatively quick motion while raking, in order to avoid as much as possible the mixing up of the grain that has fallen onto the platform and that which is falling, and then the movement of the rake back must be slow enough to allow a sufficient quantity of grain to accumulate for another bunch. This result is naturally produced to a certain extent by the peculiar relative positions of the stud K and fulcrum H, the stud being nearer the fulcrum during that portion of the revolution that does the raking; but this result may be produced in too large or too small a degree by this combination of the parts by themselves; but by varying the form of the cam-slot the motion may be adjusted to suit any circumstances, as it will be readily seen that any desired horizontal motion can be given to the rake by making the cam-slot of a suitable form as easily as any peculiar motion can be imparted to a portion of a machine from a suitably-constructed cam revolving on a shaft.

Now, having fully described the construction and operation of my invention, what I claim as new, and desire to secure by Letters Patent, is—

The combination of the rake O and plate-cam G when arranged substantially in the manner and for the purpose herein described.

JONATHAN R. WHITTEMORE.

Witnesses:
  JOHN R. WHITTEMORE,
  MILTON BRADLEY.